(12) United States Patent
Mizuno

(10) Patent No.: US 7,559,265 B2
(45) Date of Patent: Jul. 14, 2009

(54) ROBOT ARM COUPLING DEVICE

(75) Inventor: Kouji Mizuno, Aichi-ken (JP)

(73) Assignee: Star Seiki Co., Ltd., Nagoya-shi (JP)

( * ) Notice: Subject to any disclaimer, the term of this patent is extended or adjusted under 35 U.S.C. 154(b) by 124 days.

(21) Appl. No.: 11/895,465

(22) Filed: Aug. 24, 2007

(65) Prior Publication Data

US 2008/0223169 A1 Sep. 18, 2008

(30) Foreign Application Priority Data

Mar. 13, 2007 (JP) ............................. 2007-062701

(51) Int. Cl.
*B25J 17/00* (2006.01)

(52) U.S. Cl. .................... 74/490.06; 901/29; 403/24; 403/314

(58) Field of Classification Search .............. 74/490.01, 74/490.05, 490.06; 901/27, 28, 29, 50; 403/13, 403/24, 292, 314

See application file for complete search history.

(56) References Cited

U.S. PATENT DOCUMENTS

| | | | | |
|---|---|---|---|---|
| 4,636,135 A | * | 1/1987 | Bancon | 414/730 |
| 5,086,901 A | * | 2/1992 | Petronis et al. | 192/150 |
| 6,398,279 B1 | * | 6/2002 | Kikut | 294/86.4 |

2007/0231063 A1 * 10/2007 Tsutsumi et al. ......... 403/322.2

FOREIGN PATENT DOCUMENTS

JP 4-63688 A 2/1992

* cited by examiner

*Primary Examiner*—David M Fenstermacher
(74) *Attorney, Agent, or Firm*—Frishauf, Holtz, Goodman & Chick, P.C.

(57) ABSTRACT

Even if the coupling surface of an arm side attachment and a tool side attachment is directed in a direction other than the horizontal direction, the tool side attachment can be automatically separated and detached from the arm side attachment. When exchanging a tool, the worker does not have to forcibly pull out and detach a tool side attachment from an arm side attachment, a tool can be exchanged automatically, and the exchange work can be performed easily in a short period of time. When the cam member 17 is shifted from the unlocking position to the locking position, locking balls 13 which slide on locking inclined tapered surfaces 17a to be shifted to the outside along the radius direction are engaged with engaging inclined tapered surface 23a so as to mutually couple an arm side attachment 3 and a tool side attachment 5. When the cam member 17 is shifted from the locking position to the unlocking position, the engagement of the locking balls 13 with respect to the engaging inclined tapered surfaces 23a is released, and unlocking balls 15 which slide on thrusting inclined tapered surfaces 17b to be shifted to the outside along the radius direction slide on the separating inclined tapered surfaces 23b to enable to thrust the tool side attachment 5 from the arm side attachment 3.

17 Claims, 12 Drawing Sheets

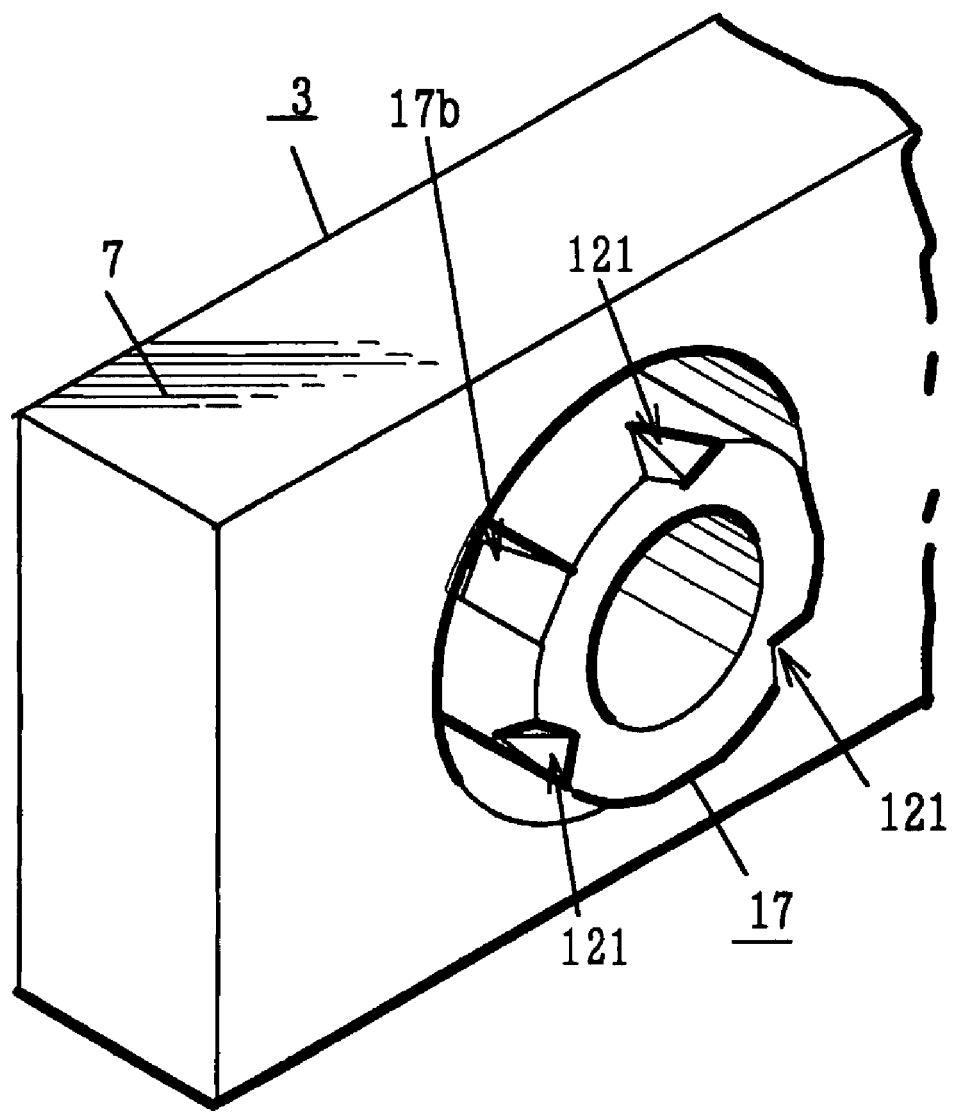

ROBOT ARM COUPLING DEVICE

BACKGROUND OF THE INVENTION

1. Field of the Invention

This invention relates to a robot arm coupling device that attaches and detaches various tools to a robot arm of a polyarticular robot, or attaches and detaches a chuck etc. to upper and lower arms, a pivot arm of a molded article takeoff device.

2. Description of the Related Art

As a coupling device capable of attaching and detaching a tool etc. to and from a robot arm, as disclosed in Jpn. Pat. Appln. Laid-Open Publication No. 4-63688, there is a known device that includes a master plate (inner assembly) which is attached to a robot arm, a tool plate (outer assembly) to which a tool etc. is attached, and locking means that couples and locks these plates.

The locking means of the device includes a cam member in the form of a disc which is slidably supported on the master plate between the locking position and the unlocking position, a plurality of ball members which are arranged around the cam member, and are slidably supported in the master plate in a direction substantially perpendicular to the sliding direction of the cam member, and a ball receiver in the form of a ring which is arranged in the tool plate, and is engaged with the ball members such that the both plates are coupled to be retained when the cam member is shifted to the locking position, and the cam member has an arm side tapered surface (cam surface) formed around the outer circumference thereof, while the ball receiver has a tool side tapered surface (cam surface) formed around the inner circumference thereof, which tool side tapered surface inclines in the reverse direction with respect to the arm side tapered surface.

The locking means mutually couples the master plate and the tool plate firmly, with the cam member located at the locking position, and with the ball members pressed by the arm side tapered surface to be made to abut on the tool side tapered surface.

Furthermore, the locking means disclosed in Jpn. Pat. Appln. Laid-Open Publication No. 4-63688 releases the pressing action by the arm side tapered surface toward the ball members and releases the engagement of the ball members with the tool side tapered surface when the cam member is shifted to the unlocking position, making the tool plate detachable from the master plate.

However, in unlocking the master plate and tool plate, when detaching the tool plate from the master plate by only releasing the pressing action by the ball members toward the tool side tapered surface, it is necessary to control the posture of the master plate and tool plate such that the coupling surface thereof is set horizontal so as to make the tool plate separate from the master plate due to the own weight of the tool plate.

Accordingly, in a robot or in the working environment which cannot control the posture such that the coupling surface of the master plate and tool plate is set horizontal, the tool plate cannot be made to automatically separate by itself. That is, in a robot arm in which the coupling surface of the master plate and tool plate is directed in a direction other than the horizontal direction, the worker has to perform the exchange work to forcibly pull out and detach the tool plate from the master plate, which plates are unlocked. At this time, there is a problem that the exchange work is troublesome and time-consuming.

SUMMARY OF THE INVENTION

The present invention has an object to provide a robot arm coupling device in which, even if the coupling surface of an arm side attachment and a tool side attachment is directed in a direction other than the horizontal direction, the tool side attachment can be separated automatically to be detached from the arm side attachment. The present invention has another object to provide a robot arm coupling device in which, when exchanging a tool, the worker does not have to forcibly pull out and detach a tool side attachment from an arm side attachment, a tool can be exchanged automatically, and the exchange work can be carried out easily in a short period of time.

BRIEF DESCRIPTION OF THE DRAWINGS

FIG. 12 shows a view to explain a variation of locking inclined grooves.

DETAILED DESCRIPTION OF THE PREFERRED EMBODIMENTS

First Embodiment

Figure 1:
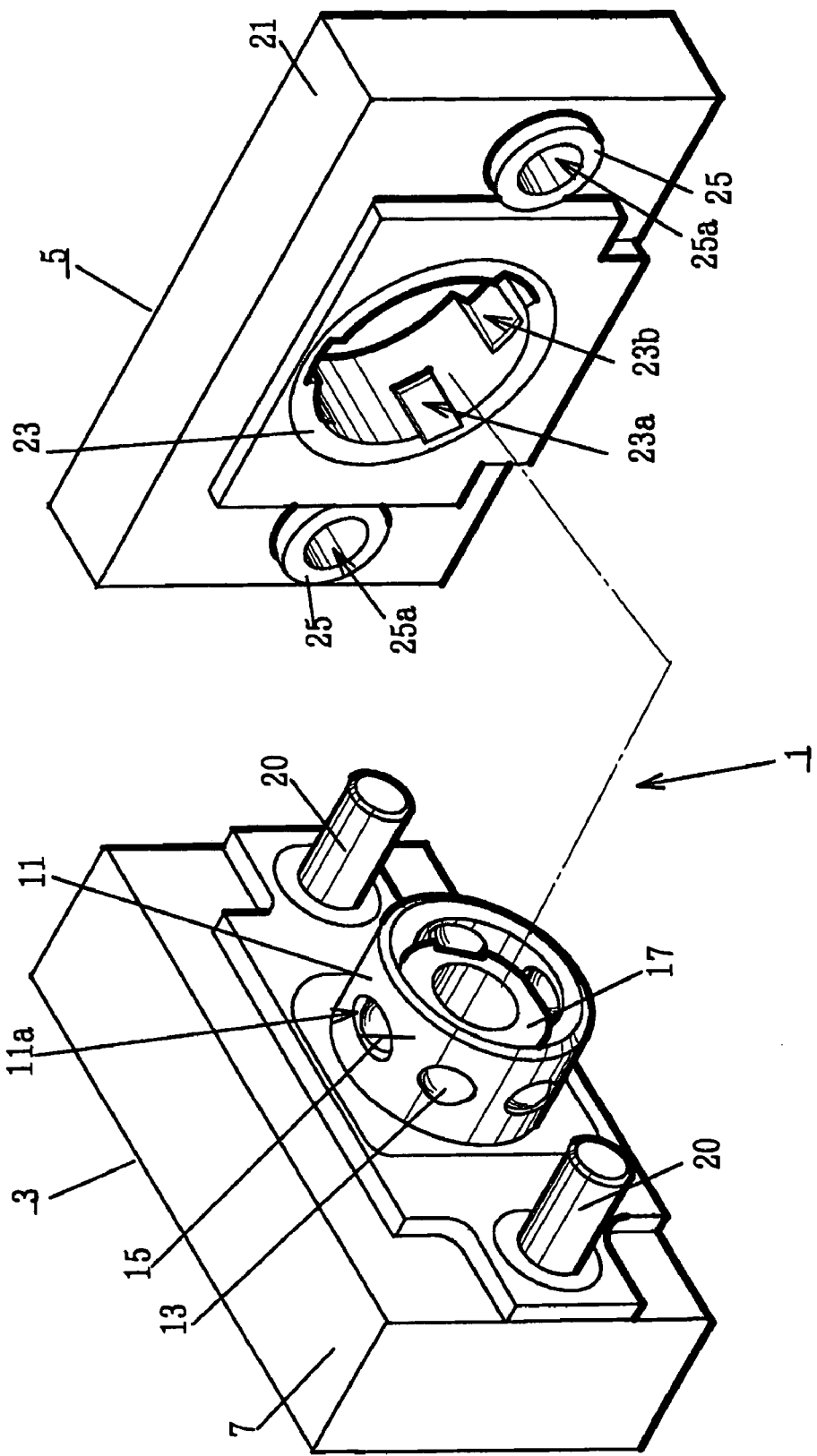
FIG. 1 shows a perspective view of a robot arm coupling device.

Referring to FIG. 1 to FIG. 4, a robot arm coupling device 1 includes an arm side attachment 3 that is fixed to the leading end of a robot arm, not shown, using screws etc., and a tool side attachment 5 to which various tools such as a chuck are attached using screws etc.

At the underside center of an arm side stationary platen 7 of the arm side attachment 3, as shown, there is provided a hollow space 7a, which is circular in transverse cross-section, that configures the cylinder room of a cylinder member 9 to be described later. Furthermore, to the arm side stationary platen 7 around the hollow space 7a, the basal end of a ball support member 11 in the form of a cylinder is attached using screws etc.

Through the ball support member 11, there are provided six ball support holes 11a, each has its axis line extended in a direction perpendicular to the axis line of the cylinder, at regular intervals in the circumference direction thereof. Each ball support hole 11a has its inner surface side diameter made slightly larger than the outer diameter of locking balls 13 and unlocking balls 15 to be described later, while has its outer surface side diameter made slightly smaller than the outer diameter of the locking balls 13 and unlocking balls 15. Part of each of the locking balls 13 and unlocking balls 15 supported in the respective ball support holes 11a can protrude from the outer circumference surface of the ball support member 11, and the locking balls 13 and unlocking balls 15 are so supported such that they are prevented from being taken out.

Within the three ball support holes 11a, which are located alternately, the locking balls 13 are supported shiftably in the radius direction. On the other hand, within the other ball support holes 11a, the unlocking balls 15 are supported shiftably in the radius direction.

In the hollow space 7a, a piston 9a of the cylinder member 9 is slidably supported between the unlocking position and the locking position in the axis line direction. At the lower part of the piston 9a, there is formed a cam member 17, as shown. The piston 9a is constantly biased to the locking position side by a compression spring 19 as an elastic member arranged in the hollow space 7a.

Furthermore, through the arm side stationary platen 7, there are provided a first and a second air passages, not shown, which communicate with the hollow space 7a respectively, and nozzles, not shown, for supplying and discharging air corresponding to the respective air passages are coupled to the arm side stationary platen 7.

The cam member 17 is in the form of a cylinder that is so configured as to have a length in the axis line direction such that, when the piston 9a is shifted to the unlocking position, the leading end of the piston 9a is located at the substantially center of the locking balls 13 and unlocking balls 15 supported in the respective ball support holes 11a of the ball support member 11. Around the outer circumference surface of the cam member 17, locking inclined tapered surfaces 17a as locking inclined grooves are so configured as to face the ball support holes 11a in which the locking balls 13 are arranged. Furthermore, also around the outer circumference surface of the cam member 17, thrusting inclined tapered surfaces 17b as thrusting inclined grooves are so configured as to face the ball support holes 11a in which the unlocking balls 15 are arranged.

Each of the locking inclined tapered surfaces 17a is formed into a tapered surface which is inclined such that the leading end side of the cam member 17 has a depth that can house the corresponding locking ball 13 without making part thereof protrude from the outer circumference surface of the ball support member 11, and the depth is made gradually reduced as heading for the basal end side (piston side) along the axis line direction. Conversely, each of the thrusting inclined tapered surfaces 17b is formed into a tapered surface which is inclined such that the basal end side of the cam member 17 has a depth that can house the corresponding unlocking ball 15 without making part thereof protrude from the outer circumference surface of the ball support member 11, and the depth is made gradually reduced as heading for the leading end side along the axis line direction.

On the arm side stationary platen 7, at both sides of the ball support member 11, there are attached a pair of pilot shafts 20 each has its axis line extended in the actuation direction of the cylinder member 9. Each of the pilot shafts 20 has its leading end part tapered such that the diameter thereof is made gradually reduced as heading for the leading end.

On the other hand, at the center of a tool side stationary platen 21 of the tool side attachment 5, there is provided an opening 21a having a size into which a ball receiving member 23, to be described later, is inserted to be fitted. Into the opening 21a of the tool side stationary platen 21, the ball receiving member 23, which is provided with a hollow space having a size into which the ball support member 11 can be inserted to be fitted, is inserted to be fixed.

Around the inner circumference surface of the ball receiving member 23, engaging inclined tapered surfaces 23a as engaging inclined grooves are so formed as to face the locking balls 13. Furthermore, also around the inner circumference surface of the ball receiving member 23, between the engaging inclined tapered surfaces 23a, separating inclined tapered surfaces 23b as separating inclined grooves are so formed as to face the unlocking balls 15 supported in the ball support holes 11a.

Each of the engaging inclined tapered surfaces 23a has its side opposing the arm side attachment 3 (under surface side in the drawing) so configured as to have a depth that can house part of the locking ball 13 which is pressed by the locking inclined tapered surface 17a of the cam member 17 shifted to the locking position and protrudes from the outer circumference surface of the ball support member 11, and has its side facing the arm side attachment 3 (upper surface side in the drawing) curved. Conversely, each of the separating inclined tapered surfaces 23b has its side facing the arm side attachment 3 so configured as to have a depth that can house part of the unlocking ball 15 which is pressed by the thrusting inclined tapered surface 17b of the cam member 17 shifted to the unlocking position and protrudes from the outer circumference surface of the ball support member 11, and has its side opposing the arm side attachment 3 curved such that the depth is made gradually reduced as heading therefor.

On the tool side stationary platen 21, at both sides of the ball receiving member 23, there are attached a pair of shaft support members 25 each has a shaft support opening 25a extended in a direction in accordance with the axis line of each of the pilot shafts 20 such that the shaft support members 25 correspond to the pilot shafts 20. The paired shaft support members 25 position, together with the paired pilot shafts 20 inserted to be fitted into the shaft support openings 25a, the arm side attachment 3 and tool side attachment 5.

The arm side attachment 3 is provided with an electric plug, not shown, connected to an electric cable and an electric signal line, and a fluid plug, not shown, connected to an air circuit. Furthermore, the tool side attachment 5 is provided with an electric connector, not shown, into which the electric plug is inserted to be connected to an electric circuit, and a fluid connector, not shown, into which the fluid plug is inserted to be connected to a fluid circuit.

Next, the operation of coupling and uncoupling the arm side attachment 3 and the tool side attachment 5 will be explained.

Figure 2:
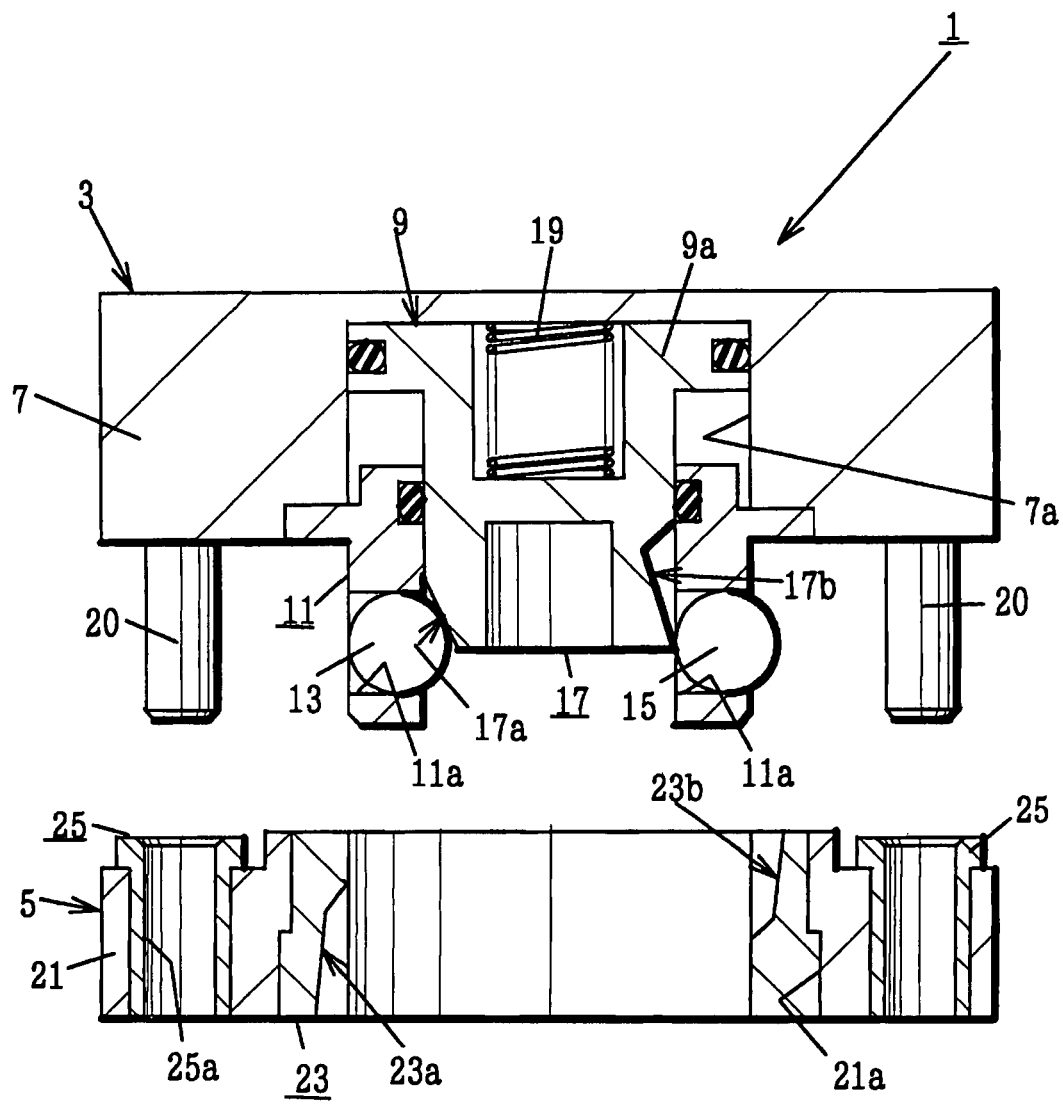
FIG. 2 shows a longitudinal sectional view of the robot arm coupling device in which a tool side attachment and an arm side attachment are separated.
Figure 3:
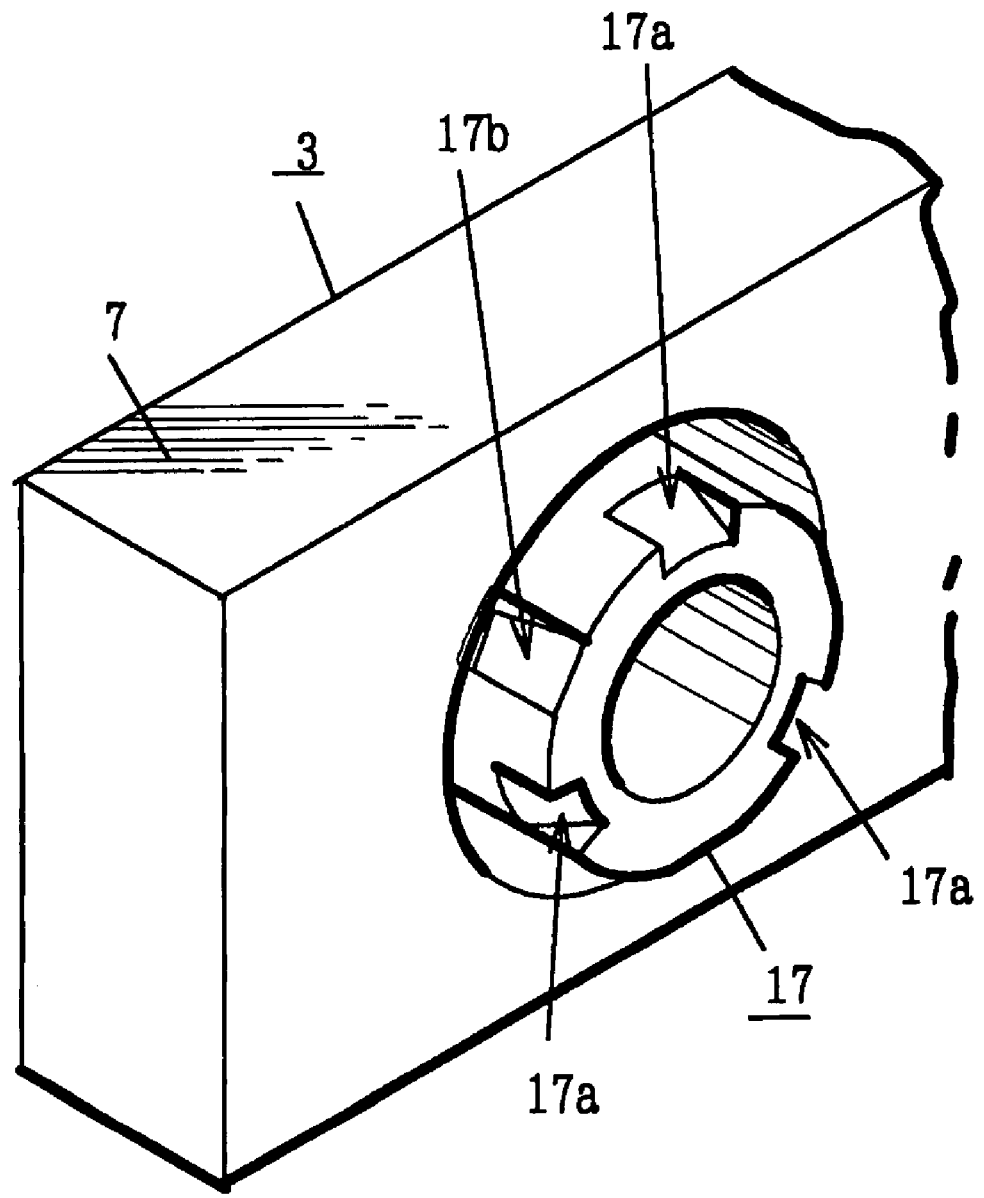
FIG. 3 shows a perspective view of a cam member in which a ball support member is removed from the tool side attachment.
Figure 4:
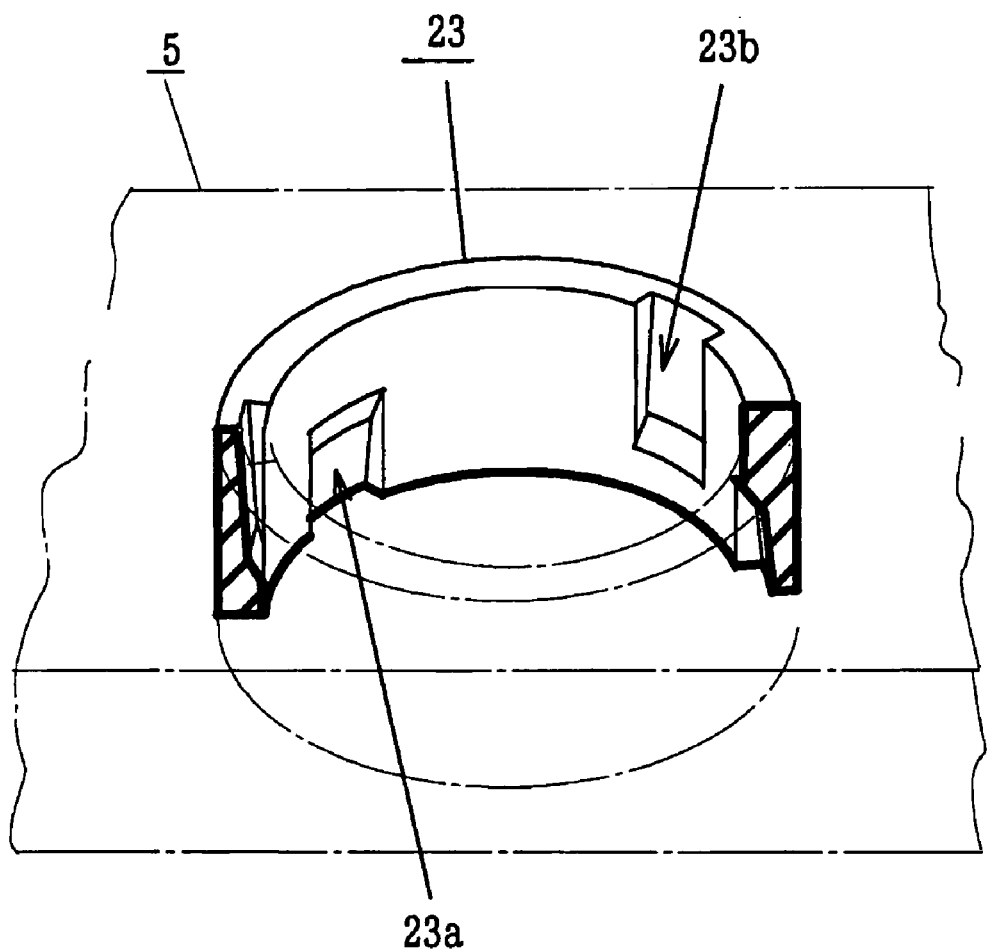
FIG. 4 shows a perspective view of a ball receiving member.

On a tool platform, not shown, the tool side attachment 5 on which various tools are attached is set horizontally. Then, a robot arm is controlled to be shifted such that the arm side attachment 3 faces the tool side attachment 5, and the axis lines of the pilot shafts 20 accord with the axis lines of the shaft support members 25, as shown in FIG. 2.

At this time, the cam member 17 of the arm side attachment 3 is shifted to the unlocking position where the leading end of the cam member 17 is located slightly below the center of the locking balls 13 and unlocking balls 15 supported in the respective ball support holes 11a.

In the above-described state, the robot arm is shifted downward so as to insert and fit the pilot shafts 20 into the shaft support openings 25a and concurrently insert and fit the ball support member 11 into the hollow space of the ball receiving member 23. Accordingly, since the pilot shafts 20 are inserted to be fitted into the shaft support openings 25a, the arm side attachment 3 and tool side attachment 5 are positioned.

Figure 5:
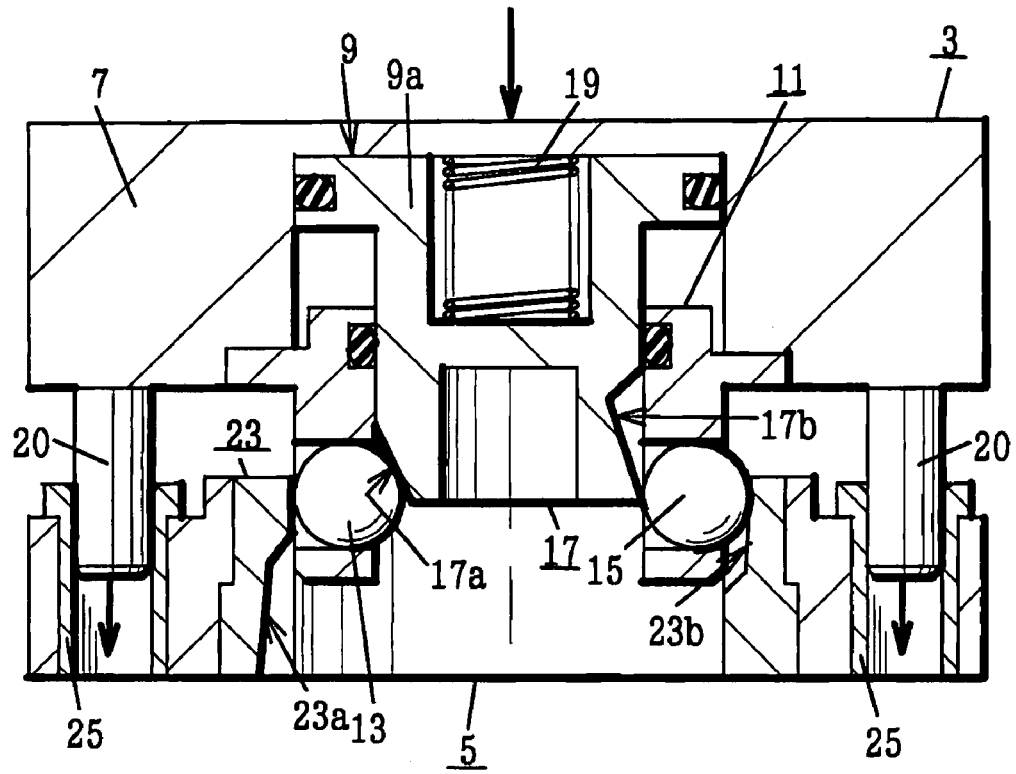
FIG. 5 shows a longitudinal sectional view indicative of the initial state in coupling the tool side attachment and arm side attachment.

In the above-described state, the locking balls 13 are located at the inclined deep groove side of the locking inclined tapered surfaces 17a of the cam member 17, and do not protrude from the outer circumference surface of the ball support member 11. On the other hand, the unlocking balls 15 are located at the inclined shallow groove side of the thrusting inclined tapered surfaces 17b of the cam member 17 to be pressed to the outside along the radius direction, and parts thereof protrude from the outer circumference surface of the ball support member 11 to be housed in the inclined deep grooves of the separating inclined tapered surfaces 23b of the ball receiving member 23, as shown in FIG. 5.

Figure 6:
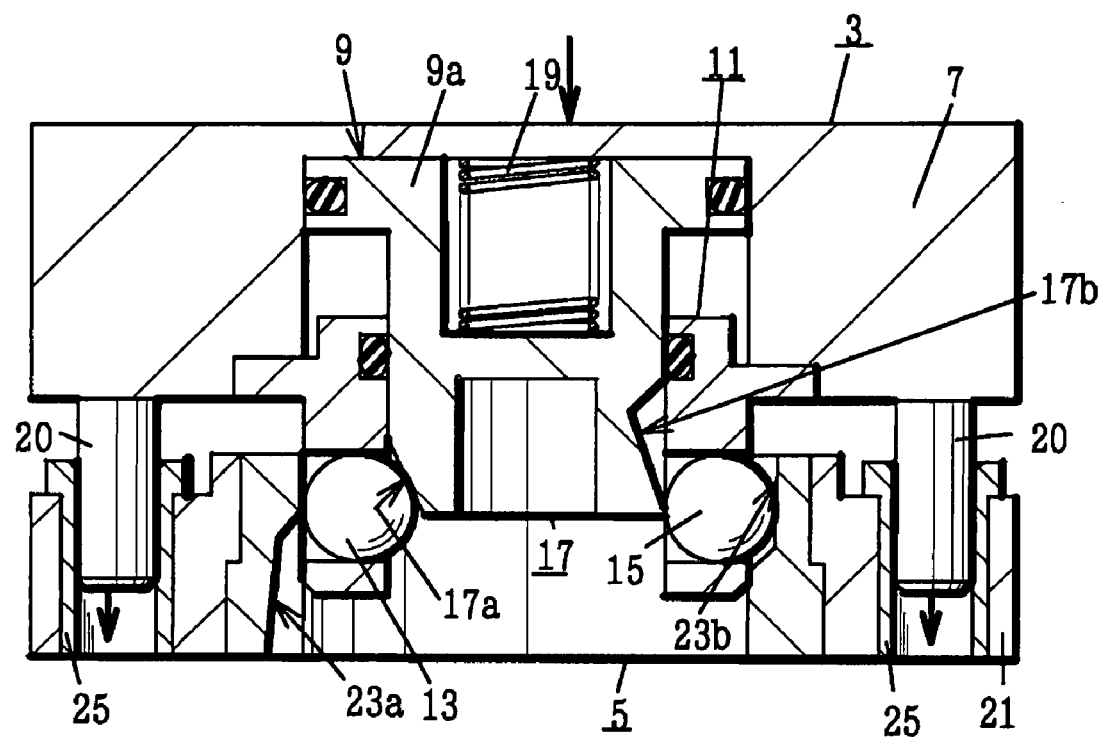
FIG. 6 shows a longitudinal sectional view indicative of the state in actuating a cylinder member.

Next, in the above-described state, as shown in FIG. 6, when the ball support member 11 is inserted to be fitted into the hollow space of the ball receiving member 23, and the locking balls 13 come to be located at the inclined shallow groove side of the engaging inclined tapered surfaces 23a, while the unlocking balls 15 come to be located at the inclined shallow groove side of the separating inclined tapered surfaces 23b, the cam member 17 is shifted from the unlocking position to the locking position by actuating the cylinder member 9.

Figure 7:
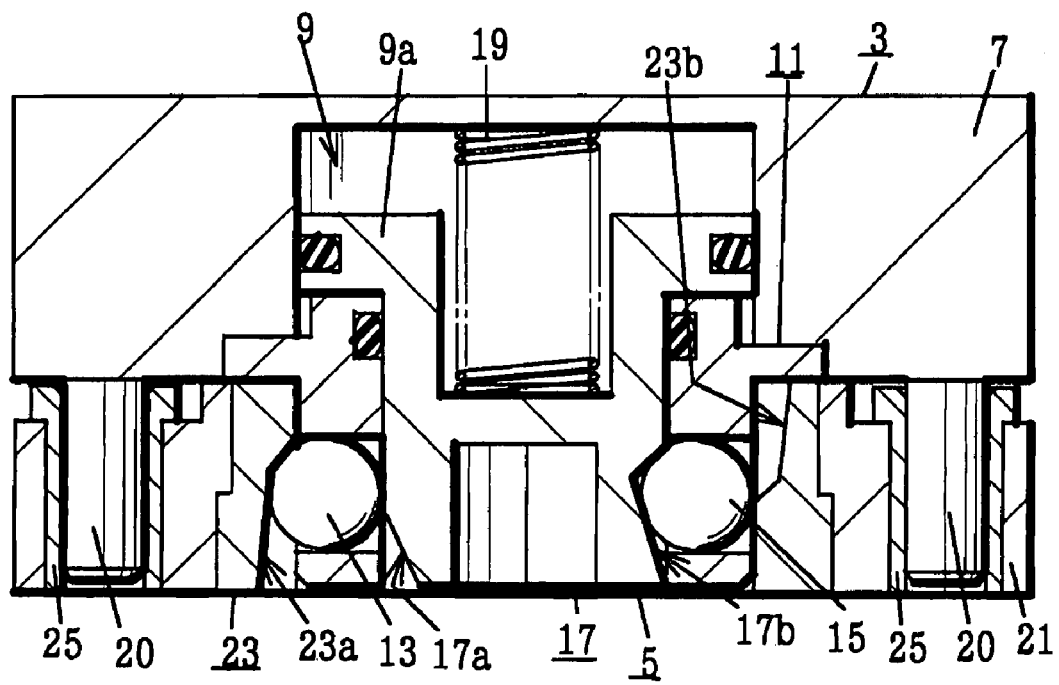
FIG. 7 shows a longitudinal sectional view indicative of the locked state.

At this time, the locking balls 13 slide on the locking inclined tapered surfaces 17a of the cam member 17, which is being shifted toward the locking position as shown in FIG. 7, from the deep groove side to the shallow groove side to be pressed to the outside along the radius direction, and parts thereof protrude from the outer circumference surface of the ball support member 11 to be engaged with the deep groove side of the engaging inclined tapered surfaces 23a.

Then, when the cam member 17 is shifted to the locking position, the locking balls 13 slide to the shallow groove side of the locking inclined tapered surfaces 17a to be pressed to the shallow groove side of the engaging inclined tapered surfaces 23a, pulling in the tool side attachment 5 to the arm side attachment 3 side to engage the tool side attachment 5 with the arm side attachment 3, coupling them closely to each other with no clearance raised therebetween.

Furthermore, when the cam member 17 is shifted from the state shown in FIG. 6 to the state shown in FIG. 7, since the cam member 17 is shifted, the unlocking balls 15 come to be located at the deep groove side of the thrusting inclined tapered surfaces 17b, the pressing action thereby being released, and can be shifted to the inside along the radius direction. In this state, since the tool side attachment 5 is pulled in to the arm side attachment 3 side, the unlocking balls 15 slide to the shallow groove side of the separating inclined tapered surfaces 23b to be shifted to the inside along the radius direction to be housed in the deep grooves of the thrusting inclined tapered surfaces 17b.

Under the above-described operation, the arm side attachment 3 and tool side attachment 5 are coupled by the three locking balls 13 which are pressed by the locking inclined tapered surfaces 17a of the cam member 17 which is shifted to the locking position, and are pressed to be engaged with the shallow groove side of the engaging inclined tapered surfaces 23a.

At the time of the above-described coupling operation, the electric plug and fluid plug of the arm side attachment 3 are inserted to be connected to the electric connector and fluid connector of the tool side attachment 5, which can supply electricity and fluid to the tool side. Furthermore, in the locked state, controlling is performed so as to maintain the coupled state by continuing the supply of air into the positive pressure room of the piston 9a. On the other hand, even if the supply of air to the cylinder member 9 is suspended due to the failure etc. of an air pressure device, the shifted state of the cam member 17 to the locking position side can be kept up due to the elastic force of the compression spring 19, maintaining the coupled state of the arm side attachment 3 and tool side attachment 5.

On the other hand, when detaching the tool side attachment 5 from the arm side attachment 3 at the time of, for example, exchanging a tool, after the robot arm is controlled to be shifted such that the tool side attachment 5 is made horizontal with respect to a tool platform, in the piston 9a, air in the positive pressure room is discharged through another nozzle and air is supplied to the back pressure room so as to shift the cam member 17 from the locking position to the unlocking position against the elastic force of the compression spring 19.

Figure 8:
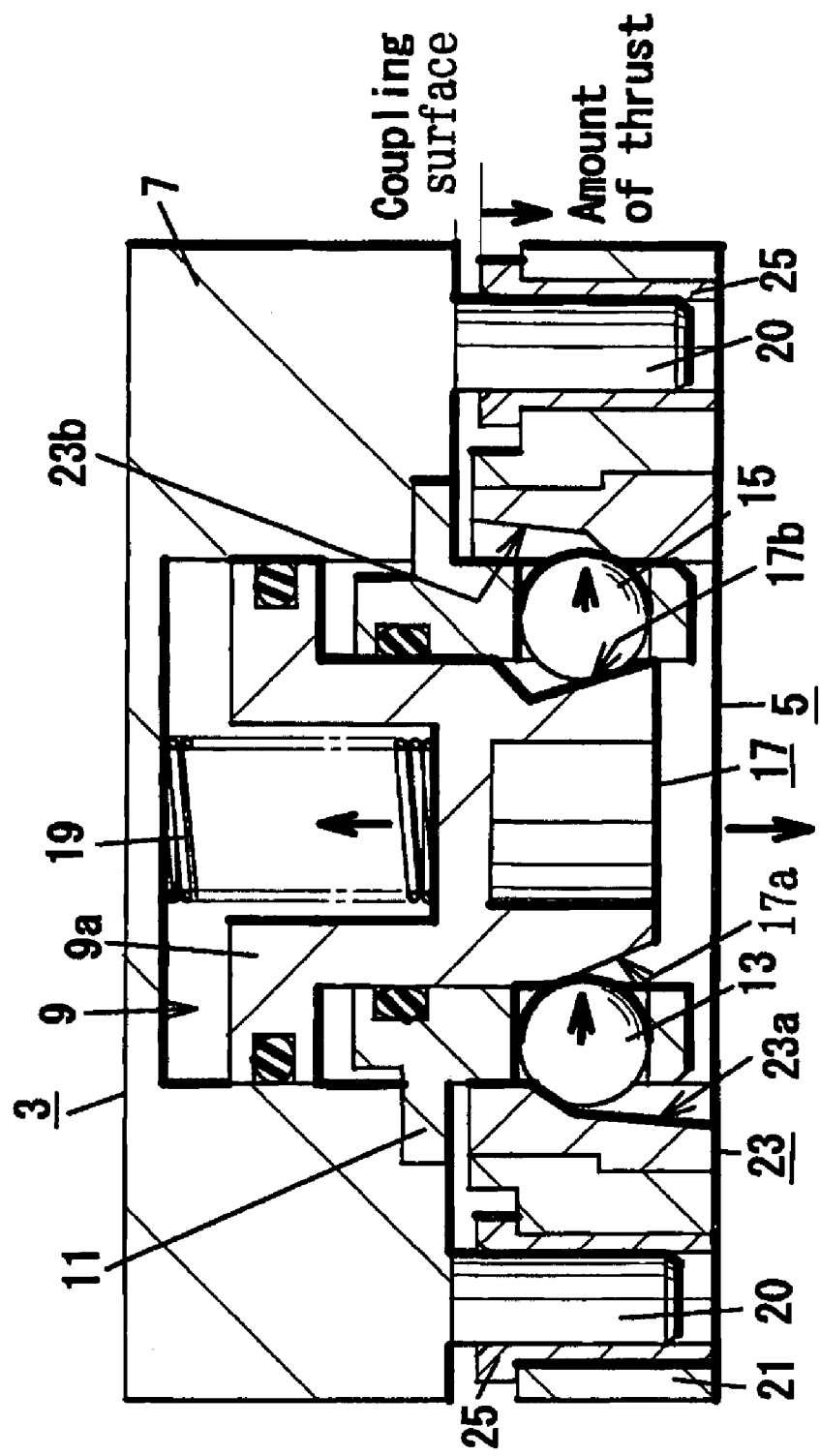
FIG. 8 shows a longitudinal sectional view indicative of the initial state in unlocking.

At this time, as shown in FIG. 8, since the cam member 17 is being shifted to the unlocking position, the locking balls 13 which come into contact with the shallow groove side of the engaging inclined tapered surfaces 23a come to be located at the deep groove side of the locking inclined tapered surfaces 17a, the pressing action by the locking inclined tapered surfaces 17a being released, and can be shifted to the inside along the radius direction.

Figure 9:
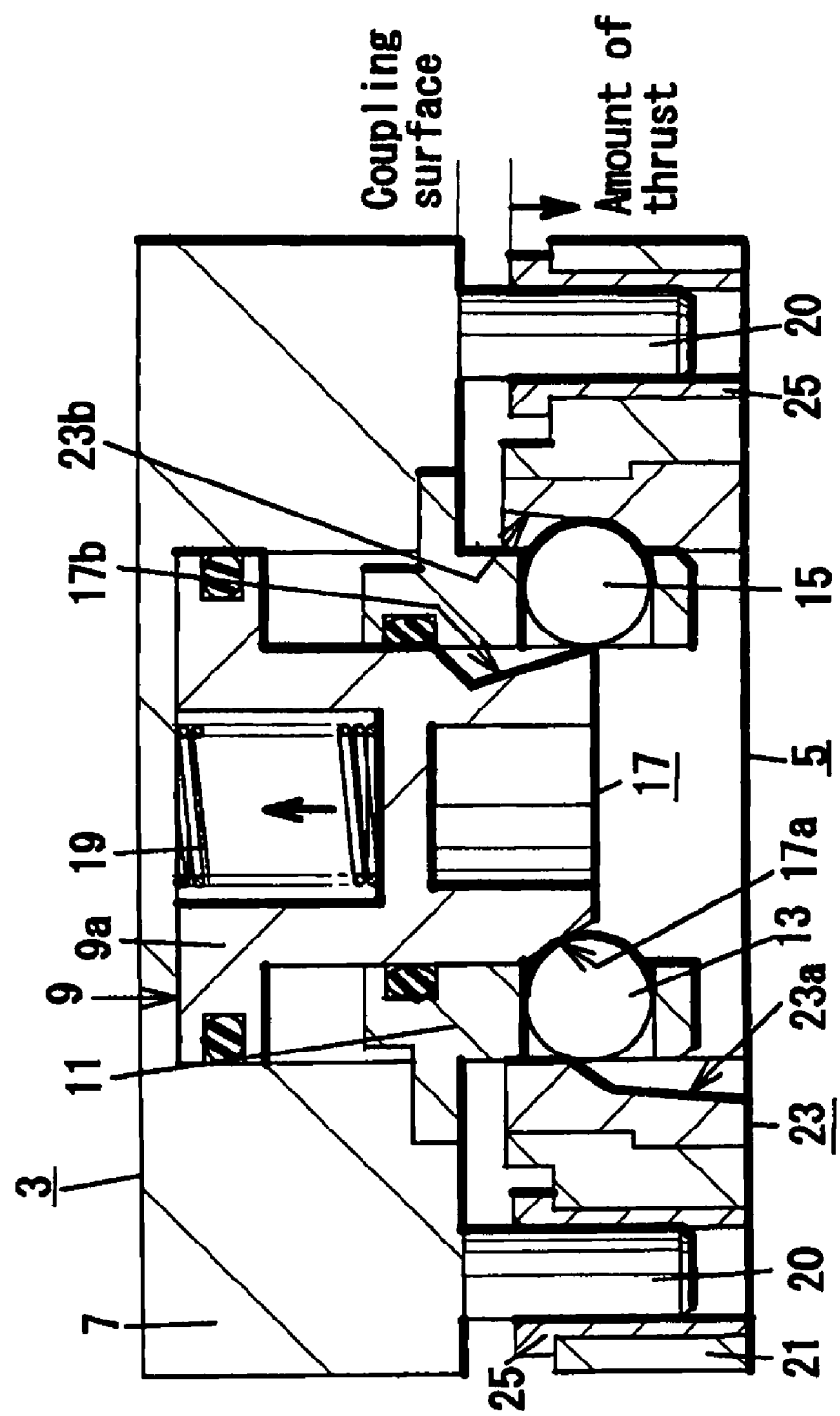
FIG. 9 shows a longitudinal sectional view indicative of the thrusting state brought about in unlocking.

Furthermore, as shown in FIG. 9, since the cam member 17 is being shifted from the locking position to the unlocking position, the unlocking balls 15 which are housed in the deep grooves of the thrusting inclined tapered surfaces 17b slide on the thrusting inclined tapered surfaces 17b from the deep groove side to the shallow groove side to be shifted to the outside along the radius direction, and slide on the corresponding separating inclined tapered surfaces 23b of the ball receiving member 23 from the shallow groove side to the deep groove side, which thrusts the tool side attachment 5 away from the arm side attachment 3.

Accordingly, the tool side attachment 5 can be forcibly thrust to be separated from the arm side attachment 3. Along with the thrust, the locking balls 13 slide on the inner circumference surface of the ball receiving member 23 from the shallow groove side of the engaging inclined tapered surfaces 23a to be shifted to the inside along the radius direction, and come to be located in the deep grooves of the locking inclined tapered surface 17a, which can uncouple the tool side attachment 5 from the arm side attachment 3.

Then, the tool side attachment 5 that is thrust from the arm side attachment 3 goes down to the tool platform due to the own weight to be completely detached from the arm side attachment 3. Especially, even if the coupling surface of the arm side attachment 3 and tool side attachment 5 is set vertical, since the tool side attachment 5 is thrust from the arm side attachment 3, the work to detach the tool side attachment 5 can be carried out easily in a short period of time.

The present invention can be modified in the following manners.

Figure 10:
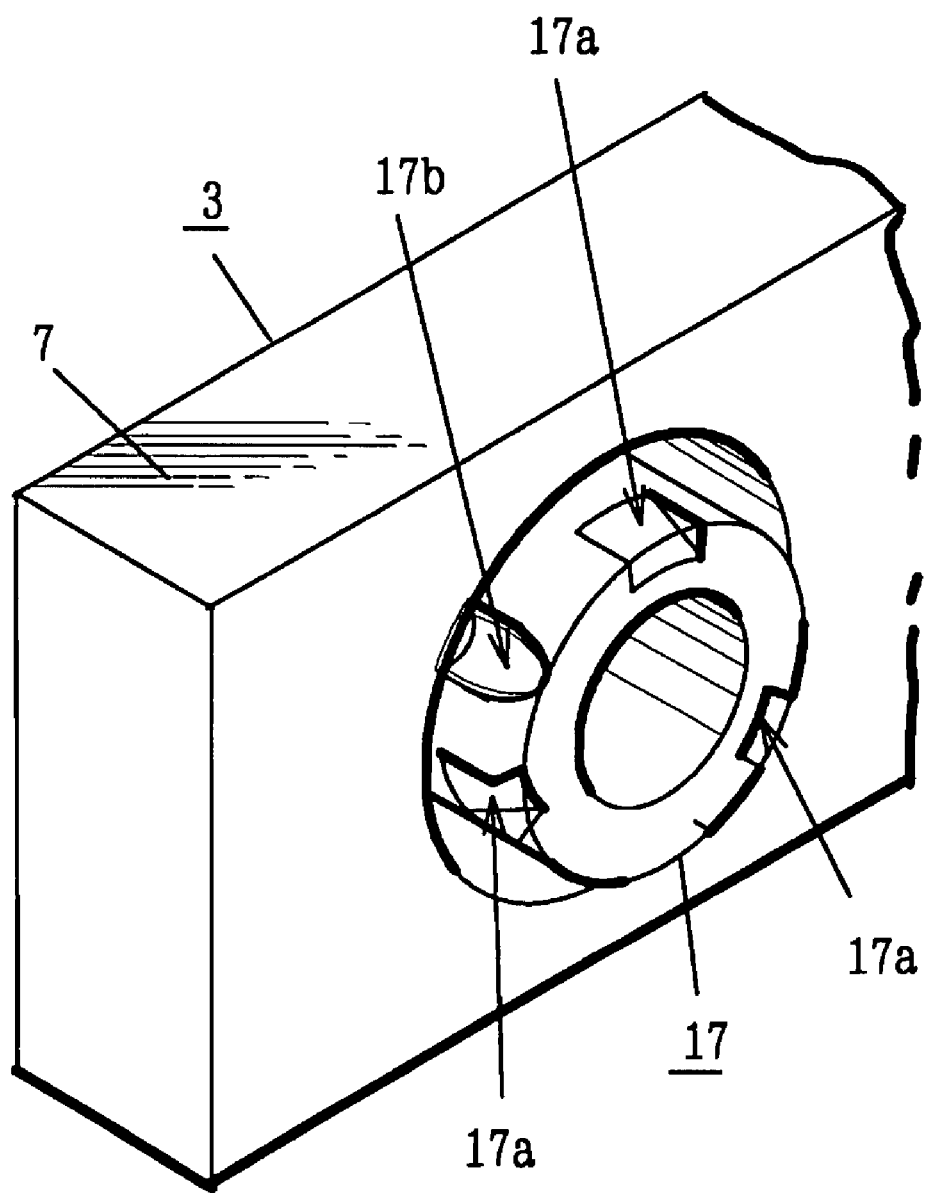
FIG. 10 shows a view to explain a variation of thrusting inclined grooves.
Figure 11:
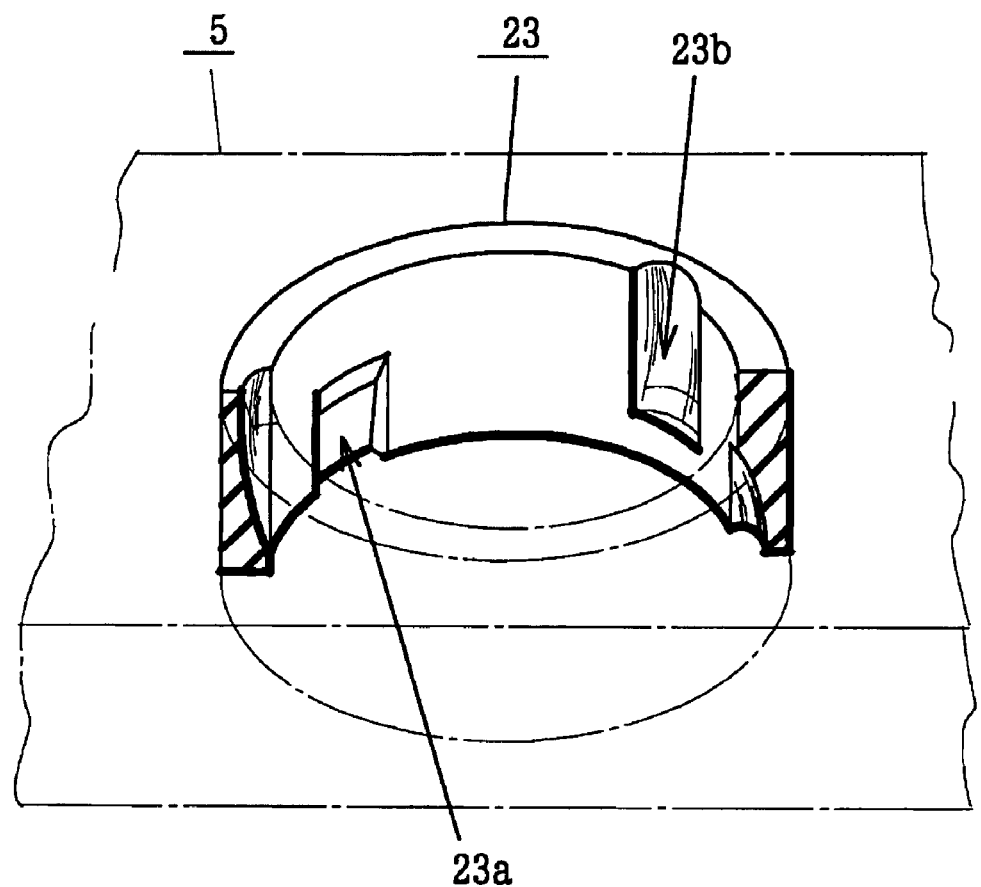
FIG. 11 shows a view to explain a variation of separating inclined grooves.

1. Each of the thrusting inclined grooves formed on the outer circumference surface of the cam member 17 and the separating inclined grooves formed on the inner circumference surface of the ball receiving member 23 is in the form of a tapered surface which is inclined toward a predetermined direction. On the other hand, as shown in FIG. 10 and FIG. 11, each of these grooves may be a groove which is circular in cross-section perpendicular the shifting direction of the cam member 17.

2. Each of the locking inclined grooves formed on the cam member 17 is in the form of an inclined tapered surface. On the other hand, each of these grooves may be an inclined pyramid groove 121 which is configured by combining two triangular surfaces, as shown in FIG. 12. In this example, each of the engaging inclined grooves facing the inclined pyramid groove 121 may be an inclined pyramid groove which is symmetrical to the inclined pyramid groove, or an inclined circular groove which is circular in cross-section perpendicular the axis line.

3. In case each of the thrusting inclined grooves formed on the outer circumference surface of the cam member 17 and the separating inclined grooves formed on the inner circumference surface of the ball receiving member 23 is in the form of a tapered surface which is inclined toward a predetermined direction, or a groove which is circular in cross-section perpendicular the shifting direction of the cam member 17, the shallow inclined top side of the groove may be curved.

What is claimed is:

1. A robot arm coupling device including a locking device that has an arm side attachment which is mounted on a robot arm, a tool side attachment on which tools are attached, a cam member which is mounted on the arm side attachment and has a plurality of locking inclined grooves formed around the axis line of the outer circumference surface thereof, an actuation member which shifts the cam member between the locking position and the unlocking position, a ball support member which is arranged on the outer circumference surface side of the cam member and shiftably supports locking balls correspondingly arranged in the locking inclined grooves in a direction perpendicular to the shifting direction of the cam member, a ball receiving member which is mounted on the tool side attachment and has a plurality of engaging inclined grooves with which the locking balls which slide on the locking inclined grooves of the cam member shifted to the locking position are engaged, and further comprising:

unlocking balls which are arranged between the locking balls and shiftably supported by the ball support member in a direction perpendicular to the shifting direction of the cam member;

a plurality of thrusting inclined grooves which are formed on the outer circumference surface of the cam member between the locking inclined grooves, and incline in a direction opposite to the inclination direction of the locking inclined grooves; and a plurality of separating inclined grooves which are formed on the ball receiving member between the engaging inclined grooves, and incline in a direction opposite to the inclination direction of the engaging inclined grooves, wherein, while when the cam member is shifted from the unlocking position to the locking position, the locking balls which slide on the locking inclined grooves to be shifted to the outside along the radius direction are engaged with the engaging inclined grooves so as to mutually couple the arm side attachment and the tool side attachment, and when the cam member is shifted from the locking position to the unlocking position, the engagement of the locking balls engaged with the engaging inclined grooves can be released, and the unlocking balls which slide on the thrusting inclined grooves to be shifted to the outside along the radius direction are made to slide on the separating inclined grooves so as to enable to thrust the tool side attachment from the arm side attachment.

2. The robot arm coupling device according to claim 1, wherein each of the locking inclined grooves and the engaging inclined grooves comprises a tapered surface which is inclined toward a predetermined direction.

3. The robot arm coupling device according to claim 1, wherein each of the locking inclined grooves and the engaging inclined grooves comprises a flat surface which is inclined toward a predetermined direction and has its shallow groove side curved.

4. The robot arm coupling device according to claim 1, wherein, of the locking inclined grooves and the engaging inclined grooves, at least the locking inclined grooves comprise inclined pyramid grooves each of which is configured by combining two triangular surfaces.

5. The robot arm coupling device according to claim 1, wherein each of the thrusting inclined grooves and the separating inclined grooves is inclined toward a predetermined direction, and is circular in cross-section perpendicular the shifting direction of the cam member.

6. The robot arm coupling device according to claim 5, wherein each of the thrusting inclined grooves and the separating inclined grooves is circular in cross-section perpendicular the shifting direction of the cam member, and has its shallow groove side curved.

7. The robot arm coupling device according to claim 1, wherein each of the thrusting inclined grooves and the separating inclined grooves comprises a flat tapered surface which is inclined toward a predetermined direction, 8. The robot arm coupling device according to claim 1, wherein the cam member is biased to the locking position side by the elastic force of an elastic member.

9. The robot arm coupling device according to claim 2, wherein each of the thrusting inclined grooves and the separating inclined grooves is inclined toward a predetermined direction, and is circular in cross-section perpendicular the shifting direction of the cam member.

10. The robot arm coupling device according to claim 9, wherein each of the thrusting inclined grooves and the separating inclined grooves is circular in cross-section perpendicular the shifting direction of the cam member, and has its shallow groove side curved.

11. The robot arm coupling device according to claim 3, wherein each of the thrusting inclined grooves and the separating inclined grooves is inclined toward a predetermined direction, and is circular in cross-section perpendicular the shifting direction of the cam member.

12. The robot arm coupling device according to claim 11, wherein each of the thrusting inclined grooves and the separating inclined grooves is circular in cross-section perpendicular the shifting direction of the cam member, and has its shallow groove side curved.

13. The robot arm coupling device according to claim 4, wherein each of the thrusting inclined grooves and the separating inclined grooves is inclined toward a predetermined direction, and is circular in cross-section perpendicular the shifting direction of the cam member.

14. The robot arm coupling device according to claim 13, wherein each of the thrusting inclined grooves and the separating inclined grooves is circular in cross-section perpendicular the shifting direction of the cam member, and has its shallow groove side curved.

15. The robot arm coupling device according to claim 2, wherein each of the thrusting inclined grooves and the separating inclined grooves comprises a flat tapered surface which is inclined toward a predetermined direction.

16. The robot arm coupling device according to claim 3, wherein each of the thrusting inclined grooves and the separating inclined grooves comprises a flat tapered surface which is inclined toward a predetermined direction.

17. The robot arm coupling device according to claim 4, wherein each of the thrusting inclined grooves and the separating inclined grooves comprises a flat tapered surface which is inclined toward a predetermined direction.

* * * * *